(12) United States Patent
Arold et al.

(10) Patent No.: US 6,439,296 B1
(45) Date of Patent: Aug. 27, 2002

(54) HEATING OR AIR-CONDITIONING SYSTEM FOR A VEHICLE OCCUPANT COMPARTMENT

(75) Inventors: Klaus Arold, Sindelfingen; Werner Krauss, Stuttgart; Klaus Kuonath, Calw; Armin Rauch, Sindelfingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/571,317

(22) Filed: May 15, 2000

(30) Foreign Application Priority Data

May 14, 1999 (DE) .......................................... 199 22 324

(51) Int. Cl.[7] .............................. B60H 3/00; B60H 1/00
(52) U.S. Cl. ...................... 165/42; 454/69; 237/12.3 R
(58) Field of Search .............................. 165/41, 42, 43, 165/204, 202, 203; 237/12.3 R, 12.3 A; 454/69, 75, 162; 62/244

(56) References Cited

U.S. PATENT DOCUMENTS

| | | | |
|---|---|---|---|
| 4,289,195 A | * 9/1981 | Bellot et al. | 237/12.3 A X |
| 4,513,808 A | 4/1985 | Ito et al. | 165/43 |
| 4,976,461 A | * 12/1990 | Takahashi | 165/42 X |
| 5,042,566 A | * 8/1991 | Hildebrand | 165/42 |
| 6,036,594 A | * 3/2000 | Kwon et al. | 165/202 X |
| 6,223,816 B1 | * 5/2001 | Arold | 165/203 X |
| 2001/0035019 A1 | * 11/2001 | Arold | 62/244 |

FOREIGN PATENT DOCUMENTS

| | | | |
|---|---|---|---|
| DE | 3203424 | | 10/1982 |
| DE | 195 24 200 C1 | * | 5/1996 |
| DE | 197 03 519 C1 | * | 4/1998 |
| DE | 19705629 | | 8/1998 |
| DE | 198 04 287 C1 | * | 3/1999 |
| DE | 19851982 | | 5/2000 |
| GB | 2 334 095 A | * | 8/1999 |
| GB | 2 336 203 A | * | 10/1999 |

\* cited by examiner

Primary Examiner—Ljiljana Ciric
(74) Attorney, Agent, or Firm—Crowell & Moring LLP

(57) ABSTRACT

A heating or air-conditioning system for a vehicle occupant compartment has an air distributor with a warm-air outlet which is connected with an air duct leading to a center plane the vehicle occupant compartment. A cold-air bypass controlled by a cold-air flap is provided for lowering the temperature of the warm air flowing out of the warm air outlet to the air duct. In the cold-air bypass, which has a relatively small cross-section, a throttling element is coupled with the cold-air flap such that the cold-air flap partially, to a defined extent, covers the warm-air outlet in the open position of the cold-air flap, thus maximally opening up the cold-air bypass. In addition, in this arrangement the throttling element completely opens up the warm-air outlet in the closed position of the cold-air flap, thus completely blocking the cold-air bypass.

24 Claims, 1 Drawing Sheet

HEATING OR AIR-CONDITIONING SYSTEM FOR A VEHICLE OCCUPANT COMPARTMENT

BACKGROUND AND SUMMARY OF THE INVENTION

This application claims the priority of German Application No. 199 22 324.6, filed in Germany on May 14, 1999, the disclosure of which is expressly incorporated by reference herein.

The invention relates to a heating or air-conditioning system for a vehicle occupant compartment having an air distributor with a warm-air outlet which is connected with an air duct leading to air outlet devices arranged in a center plane of the vehicle occupant compartment, and having a cold-air bypass controlled by a cold-air flap, for lowering the temperature of warm air flowing out of the warm air outlet to the air duct.

In the case of a known air-conditioning system of this type for motor vehicles (German Patent Document DE 32 03 424 C), on the one side, a warm-air flap is arranged at the warm-air outlet and, and on the other side, a cold-air flap is arranged at the inlet of the cold-air bypass for controlling the temperature of the air flowing into the center plane of the vehicle occupant compartment. The warm-air flap divides the air flowing out of the warm-air outlet into two warm-air flows, of which one is guided to an air duct leading to the center plane of the vehicle occupant compartment and the other is guided to an air duct leading to the leg space of the vehicle occupant compartment. By means of a more or less extensive opening of the cold-air flap, cold air can be admixed to the warm-air flow branched off to the center plane, so that a desired temperature of the mixed air is obtained. For setting the temperature in the center plane, the two air flaps are controlled separately, in which case, for keeping the air quantity constant which flows into the center plane, the warm-air flap is increasingly closed as the opening of the cold-air flap increases. In the case of the known air-conditioner, this type of flap control necessarily leads to an increase of the warm-air quantity flowing into the leg space, so that, for avoiding this effect, it is again absolutely necessary to provide an additional cold-air and warm-air flap for controlling the air flowing into the leg space.

In the case of a heating or air-conditioning system of this type (German Patent Document DE 198 51 982.6), it has been suggested, for the purpose of a simplified automatic temperature control for the center plane of the vehicle occupant compartment and for the manual temperature reduction in the center plane, to arrange a so-called center plane air flap for controlling the duct cross-section in the air duct leading to the air outflow devices in the center plane of the vehicle occupant compartment and to forcibly couple the center plane air flap with the cold-air flap of the cold-air bypass such that, for a maximal heating, the cold air flap and the center plane air flap are closed; for the automatic control of the air quantity to the center plane, the cold-air flap is closed; and the center plane flap is opened up corresponding to the desired air quantity and, for lowering the temperature in the center plane, the automatic center nozzle key is unlocked and, by rotating an operating element, the cold-air flap is correspondingly manually opened. In the case of such a heating or air-conditioning system, it is problematic that, while the cold-air bypass has a space-related small design, a desired maximal temperature reduction of, for example, 400° K. in the center plane of the vehicle occupant compartment is not reached.

It, is an object of the invention to improve a heating or air-conditioning system of the initially mentioned type such that, also when the cross-sectional design of the cold-air bypass is small as the result of the limited space, a sufficient lowering of the temperature is achieved in the center plane.

According to the invention, this object is achieved by providing a system of the above-noted general type, wherein a throttling element is coupled with the cold-air flap such that in one end position the throttling element partially covers the warm-air outlet to a defined extent in an open position of the cold-air flap, which maximally opens up the cold-air bypass. In a second end position of the throttling element, the throttling element completely opens the warm air outlet up in a closed position of the cold-air flap, which completely blocks the cold-air bypass. The throttling element moves continuously between these two end positions with the swiveling of the cold-air flap.

The heating or air-conditioning system according to the invention has the advantage that, as the result of the throttling element which, when the cold-air flap is fully opened, swivels or pushes into the warm-air outlet of the air distributor, the warm-air flow is throttled downstream of the bypass mouth. As a result, less warm air enters into the air duct leading to the center plane. Simultaneously, by way of the throttling element, which increasingly covers the warm-air outlet to a defined maximal extent, the air flow to the air duct leading to the center plane becomes increasingly more diffuse as the center plane temperature becomes colder. Accordingly, the approaching air flow by way of colder air is perceived to be more comfortable by the occupants of the vehicle occupant compartment and thus causes an increase of the air-conditioning comfort.

Advantageous embodiments of the heating or air-conditioning system with expedient developments and further developments of the invention are described herein and in the claims.

According to alternative embodiments of the invention, the movable throttling element can be constructed as a swivel flap, a slide or an air guiding element in the form of a curved two-blade swivel flap. In addition, in order to avoid additional air noise, the throttling element can be enclosed by a foamed material, a foamed material can be sprayed around it or it can be foamed in by way of a foamed material. A perforation in the slide or flap surface of the throttling element reduces the throttling effect. By means of an appropriate selection of the hole grid and of the hole diameter, the throttling effect can be adapted in an extremely precise manner.

Other objects, advantages and novel features of the present invention will become apparent from the following detailed description of the invention when considered in conjunction with the accompanying drawings.

DETAILED DESCRIPTION OF THE DRAWINGS

Figure 1:
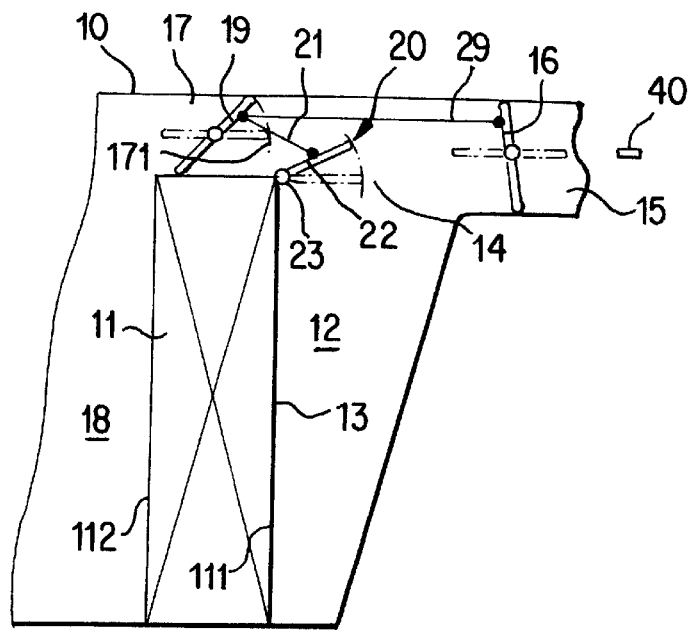
FIG. 1 is a schematic longitudinal sectional view of an air guiding box of a heating or air-conditioning system for an occupant compartment of a vehicle, constructed according to a preferred embodiment of the invention.

FIG. 1 is a schematic cutout-type longitudinal sectional view of an air guiding box 10 of a heating or air-conditioning system for a vehicle occupant compartment, in which a heat exchanger 11 is arranged. In the case of an air conditioner, an evaporator is arranged in a spaced manner in front of the heat exchanger 11 viewed in the flow direction. Directly behind the heat exchanger 11, an air distributor 12 is constructed in the air box 10, which air distributor 12 has a warm-air inlet 13, which is completely covered by the air outlet surface 111 of the heat exchanger 11, and a warm-air outlet 14 which extends approximately at the level of the top side of the heat exchanger 11 transversely to the warm-air inlet 13 and which is connected with an air duct 15. The air duct 15 leads to air outflow devices 40 which are arranged in the center plane of the vehicle occupant compartment, preferably in the dashboard of the vehicle, and are called center nozzles and side nozzles. An air flap, in the following called center plane flap 16, is arranged in the air duct 15. By means of this center plane flap 16, the size of the duct cross-section opened up for the air inflow can be controlled and thus the air quantity arriving at the air outflow devices can be adjusted. Above the heat exchanger 11, a cold-air bypass 17 is constructed in the air guiding box 10, the mouth 171 of the cold-air bypass 17 being situated above the air outlet surface 111 of the heat exchanger 11 and thus, together with the warm-air inlet 13 of the air distributor 12, being situated in a vertical plane. The cold-air bypass 17 branches off a cold-air space 18 which is situated in front of the heat exchanger 11 and which, on the one hand, is bounded by the air inlet surface 112 of the heat exchanger 11 and, in the case of an air conditioner, is bounded by the air outlet surface of the evaporator. In the cold-air bypass 17, a cold-air flap 19 is arranged which can be swiveled from a closed position (illustrated by a solid line in FIG. 1) completely blocking the cold-air bypass 17 into an open position (illustrated by a broken line in FIG. 1) completely opening up the cold-air bypass 17 and vice versa. This cold-air flap 19 can take up any swiveling position between these two extreme positions. Depending on the position of the cold-air flap 19, a smaller or larger quantity of cold air is admixed to the warm air flowing out at the warm-air outlet 14 of the air distributor 12 to the air duct and, as the result, the temperature level in the center plane of the vehicle occupant compartment is lowered.

In order to obtain a sufficiently large temperature reduction of the temperature level while the cold-air flap 19 is completely open, a throttling element 20 is forcibly coupled with the cold-air flap 19 such that it partially, to a defined extent, covers the warm-air outlet 14 in the open position of the cold-air flap 19 which maximally opens up the cold-air bypass 17, and completely opens it up in the closed position of the cold-air flap 19 which completely blocks the cold-air bypass 17. In intermediate positions of the cold-air flap 19, a more or less reduced part of the portion of the warm-air outlet 19 which can be maximally covered by the throttling element 20 is covered. The forced coupling between the cold-air flap 19 and the throttling element 20 is symbolized in FIG. 1 by a coupling rod 21.

In the embodiment of FIG. 1, the throttling element 20 is a single-blade swivel flap 22, whose swiveling axis 23 is arranged at the abutting point of the bypass mouth 171, the warm-air inlet 13 and the warm-air outlet 14 and, on the side of the air outlet surface 111 of the heat exchanger 11, extends along the whole width of the warm-air inlet 13, the warm-air outlet 14 and the bypass mouth 171 (perpendicular to the plane of the drawing in FIG. 1) and can cover maximally less than 50% of the warm-air outlet 14. In this position of the swivel flap 22, the warm air exiting by way of the warm-air outlet 14 is throttled considerably more than without a swivel flap 22 so that the temperature of the mixed air flowing to the air duct 15 can be lowered significantly more.

Figure 2:
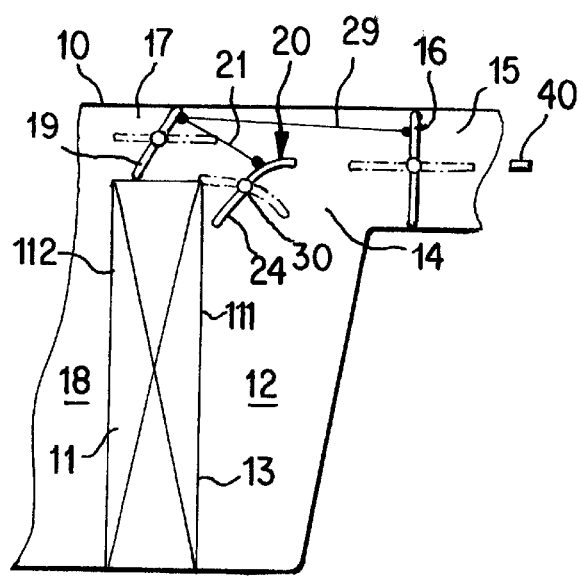
FIGS. 2 and 3 each are similar schematic views as in FIG. 1 showing respective modified throttling elements according to two further embodiments of the invention.

In the embodiment of FIG. 2, the throttling element 20 is constructed as an air guiding element, specifically as a curved two-blade swivel flap 24, whose convex side points to the bypass mouth 171. The swiveling axis 30 of the two-blade swivel flap 24 is arranged in the plane of the warm-air outlet 14 and extends at such a distance from the abutting point of the bypass mouth 171, the warm-air inlet 13 and the warm-air outlet 14 that, in the position of the swivel flap 24 (illustrated by a broken line in FIG. 2) causing the partial covering of the warm-air outlet 14, the left flap blade reaches to the abutting point. In the position of the swivel flap 24 (illustrated by a solid line in FIG. 2) which completely opens up the warm-air outlet 14, the swivel flap 24 siphons off a partial air flow from the warm-air inlet 13 or the air outlet surface 111 of the heat exchanger 11 and guides it directly in the direction of the bypass mouth 171.

Figure 3:
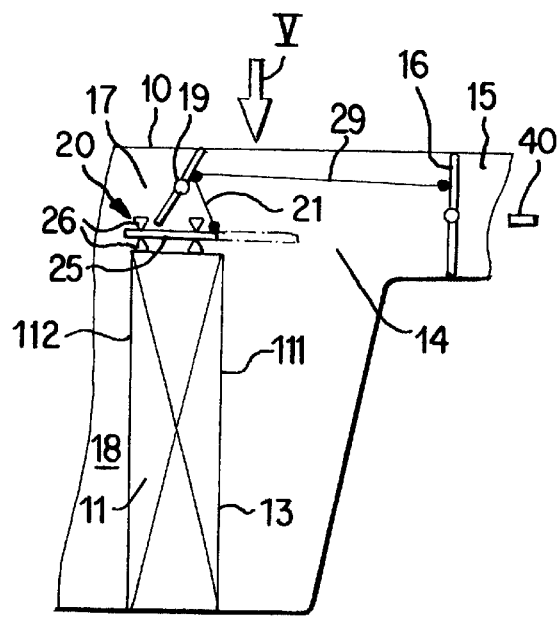

In the embodiment of FIG. 3, the throttling element 20 is constructed as a slide 25 which is axially displaceably guided in parallel to the plane of the warm-air outlet 14. In FIG. 3, the guide 26 of the slide 25 is symbolized by a total of four triangles. In this case, the slide 25 is arranged in the cold-air bypass 17 directly on the top side of the heat exchanger 11 in parallel thereto and is displaced by way of the coupling 21 to the cold-air flap 19, when the cold-air flap 19 is opened up, through the bypass mouth 171 into the plane of the warm-air outlet 14 (illustrated by a broken line in FIG. 3), so that a portion of the warm air exiting at the warm-air outlet 14 is throttled again.

Figure 4:
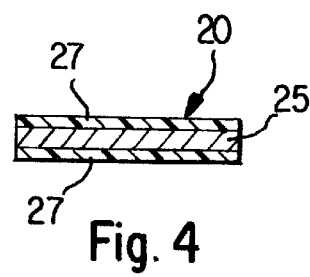
FIG. 4 is a schematic cross-sectional view of the throttling element in FIG. 3.

For an extensive suppression of flow noises occurring at the throttling element 20, the throttling element 20, as illustrated in the sectional view of FIG. 4 for the slide 25 in FIG. 3, can be surrounded or coated by a foamed material 27. Preferably, the foamed material is foamed or sprayed or around the throttling element 20.

Figure 5:
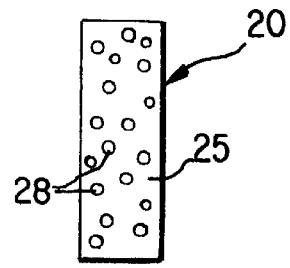
FIG. 5 is a top view of a modified throttling element in the direction of the arrow V in FIG. 3.

As a modification of the throttling element 20, the throttling element surface causing the partial covering of the warm-air outlet 14 can have a perforation 28, as illustrated in the top view of the slide 25 shown in FIG. 5, for the slide 25 forming the throttling element 20. By means of this perforation 28, the throttling effect of the throttling element 20 can be adjusted in a defined manner, specifically by the number and the clear diameter of the perforation 28. In addition, the perforation 28 causes an improved mixing of the warm air and the cold air before the entrance into the air duct 15.

In all embodiments of the air guiding box 10 illustrated in FIGS. 1 to 3, the center plane flap 16 can additionally be forcibly coupled with the cold air flap 17, which is symbolized in FIGS. 1 to 3 by a coupling rod 29. This forced coupling between. the air flap 17 and the center plane flap 16 can take place, for example, as described in German Patent Document DE 198 51 982.6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heating or air-conditioning system for a vehicle occupant compartment, having an air distributor with a warm-air outlet which is connected with an air duct leading to air outlet devices arranged in a center plane of the vehicle occupant compartment, and having a cold-air bypass controlled by a cold-air flap, for lowering the temperature of warm air flowing out of the warm air outlet to the air duct, wherein a throttling element is coupled with the cold-air flap such that in one end position the throttling element partially covers the warm-air outlet to a defined extent while the cold-air flap is in a maximally open position which opens the cold-air bypass, and such that in a second end position the throttling element completely opens the warm air outlet while the cold-air flap is in a completely closed position which blocks the cold-air bypass, wherein the throttling element moves continuously between these two end positions in response to swiveling of the cold-air flap.

2. The system according to claim 1, wherein the air distributor has a warm-air inlet which corresponds to an air outlet surface of a heat exchanger, which warm-air inlet is situated below an opening of the cold-air bypass in a vertical plane with the opening of the cold-air bypass, wherein the warm-air outlet is arranged transversely to and between the warm-air inlet and the bypass opening, and wherein the throttling element is constructed so that it can swivel or slide into the warm-air outlet.

3. The system according to claim 2, wherein a surface of the throttling element has a perforation.

4. The system according to claim 2, wherein a foamed material surrounds or coats the throttling element.

5. The system according to claim 2, wherein the throttling element is a single-blade swivel flap having an axis of rotation which is disposed at an intersection of the bypass mouth, the warm-air inlet and the warm-air outlet and extending in the plane of the warm-air outlet.

6. The system according to claim 5, wherein the axis of rotation extends along an air outlet surface of the heat exchanger along an upper edge of the heat exchanger.

7. The system according to claim 2, wherein the throttling element is a slide which is axially displaceable in parallel to the plane of the warm-air outlet.

8. The system according to claim 7, wherein the slide is disposed in a guide in the cold-air bypass directly on the top side of the heat exchanger and parallel thereto, and is displaceable through the cold-air bypass mouth into a plane of the warm-air outlet.

9. The system according to claim 2, wherein the throttling element is shaped to guide air such that in the position in which the throttling element completely opens up the warm-air outlet, the throttling element siphons off a partial air flow from the warm-air inlet of the air distributor and guides it in the direction of the bypass opening.

10. The system according to claim 9, wherein the air guiding element is a curved two-blade swivel flap having an axis of rotation situated in the plane of the warm-air outlet at a distance from an intersection of the bypass opening, the warm-air inlet and the warm-air outlet such that when the swivel flap is positioned so as to partially cover the warm-air outlet, one of the blades of the two-blade flap extends to the intersection.

11. The system according to claim 1, wherein a surface of the throttling element has a perforation.

12. The system according to claim 1, wherein a foamed material surrounds or coats the throttling element.

13. The system according to claim 1, wherein, in the air duct connecting the warm-air outlet with the air outflow devices, a center plane air flap is disposed for controlling air flow through the air duct and is forcibly coupled with the cold-air flap.

14. A heating or air conditioning system for a vehicle occupant compartment comprising:

a heat exchanger interposed between a cold air space and a warm air distributor space, a cold air bypass extending in bypassing relation to the heat exchanger between the cold air space and an outlet end of the warm air distributor space, an air duct disposed downstream of the warm air distributor space and leading to air outlet devices disposed in a center plane of a vehicle occupant compartment center plane, a cold-air flap operable to control flow through the cold air bypass to thereby control the temperature of air flowing into the air duct, and a throttling element coupled with the cold-air flap and operable to move between a first end position partially blocking a warm air flow from the warm air distributor space to the air duct when the cold-air flap is in a maximally open position, and a second end position opening up the warm air flow from the warm air distributor space to the air duct when the cold-air flap is in a maximally closed position blocking flow through the bypass, said throttling element being continuously movable in conjunction with the cold-air flap between said first and second end positions.

15. The system according to claim 14, wherein the warm air distributor space has a warm air inlet covered by an air outlet surface of the heat exchanger, said warm air inlet being disposed below the opening of the cold air bypass, wherein the opening of the warm air distributor space to the air duct is disposed between the warm air inlet and the bypass opening at a position transverse to the bypass opening, and wherein the throttling element is moveable into the opening of the warm air distributor space to the air duct.

16. The system according to claim 15, wherein the throttling element is a slide which is axially displaceable in parallel to the plane of the warm-air outlet.

17. The system according to claim 16, wherein the slide is disposed in a guide in the cold-air bypass directly on the top side of the heat exchanger and parallel thereto, and is displaceable through the cold-air bypass mouth into a plane of the warm-air outlet.

18. The system according to claim 15, wherein the throttling element is shaped to guide air such that in the position in which the throttling element completely opens up the warm-air outlet, the throttling element siphons off a partial air flow from the warm-air inlet of the air distributor and guides it in the direction of the bypass opening.

19. The system according to claim 15, wherein the air guiding element is a curved two-blade swivel flap having an axis of rotation situated in the plane of the warm-air outlet at a distance from an intersection of the bypass opening, the warm-air inlet and the warm-air outlet such that when the swivel flap is positioned so as to partially cover the warm-air outlet, one of the blades of the two-blade flap extends to the intersection.

20. The system according to claim 14, wherein the throttling element is perforated to control sound emissions during operation.

21. The system according to claim 14, wherein the throttling element is covered with foam to control sound emissions during operation.

22. The system according to claim 14, wherein the throttling element is a single-blade swivel flap having an axis of rotation which is disposed at an intersection of the bypass mouth, the warm-air inlet and the warm-air outlet and extending in the plane of the warm-air outlet.

23. The system according to claim 22, wherein the axis of rotation extends along an air outlet surface of the heat exchanger along an upper edge of the heat exchanger.

24. The system according to claim 14, wherein in the air duct connecting the warm-air outlet with the air outflow devices, a center plane air flap is disposed for controlling air flow through the air duct and is forcibly coupled with the cold-air flap.

* * * * *